US012640663B2

(12) United States Patent
Chang et al.

(10) Patent No.: US 12,640,663 B2
(45) Date of Patent: May 26, 2026

(54) POWER CONVERSION APPARATUS FOR LIMITED POWER SUPPLY PROTECTION

(71) Applicant: Power Forest Technology Corporation, Hsinchu County (TW)

(72) Inventors: Chihwei Chang, Hsinchu County (TW); Rong-Jie Tu, Hsinchu County (TW); Chien Lung Li, Hsinchu County (TW); Chieh-An Yu, Hsinchu County (TW); Hung-Chih Chiu, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 211 days.

(21) Appl. No.: 18/630,984

(22) Filed: Apr. 9, 2024

(65) Prior Publication Data

US 2025/0286470 A1     Sep. 11, 2025

(30) Foreign Application Priority Data

Mar. 8, 2024     (TW) ................................. 113202357

(51) Int. Cl.
H02M 1/00          (2007.01)
H02M 1/32          (2007.01)
H02M 7/219         (2006.01)
(52) U.S. Cl.
CPC ............. H02M 7/219 (2013.01); H02M 1/32 (2013.01)

(58) Field of Classification Search
CPC ............................ H02M 3/33523; H02M 1/32
See application file for complete search history.

(56) References Cited

U.S. PATENT DOCUMENTS

| | | | |
|---|---|---|---|
| 10,141,830 B1 * | 11/2018 | Chung | H02M 1/08 |
| 2012/0176057 A1 * | 7/2012 | Koutensky | H05B 45/10 |
| | | | 315/210 |
| 2013/0215651 A1 * | 8/2013 | Liao | H02M 5/40 |
| | | | 363/34 |
| 2014/0198535 A1 * | 7/2014 | Yang | H02M 3/33523 |
| | | | 363/16 |
| 2017/0187282 A1 * | 6/2017 | Wang | H02M 1/12 |
| 2018/0323717 A1 * | 11/2018 | Chang | H02M 1/36 |
| 2020/0187328 A1 * | 6/2020 | Chen | H05B 45/36 |

FOREIGN PATENT DOCUMENTS

CN          105553263 A  *  5/2016   ............. H02M 1/44

* cited by examiner

*Primary Examiner* — Sisay G Tiku
(74) *Attorney, Agent, or Firm* — JCIPRNET

(57)          ABSTRACT

A power conversion apparatus is provided. A bargaining circuit adjusts a feedback voltage output by an optocoupler to make a control circuit reduce an output voltage of a transformer circuit, and turns off the optocoupler when the output voltage of the transformer circuit is lower than a first setting voltage to increase the feedback voltage. The control circuit executes a limited power operation when the output voltage of the transformer circuit is lower than the first setting voltage and the feedback voltage is higher than a second setting voltage.

9 Claims, 3 Drawing Sheets

POWER CONVERSION APPARATUS FOR LIMITED POWER SUPPLY PROTECTION

CROSS-REFERENCE TO RELATED APPLICATION

This application claims the priority benefit of Taiwan application serial no. 113202357, filed on Mar. 8, 2024. The entirety of the above-mentioned patent application is hereby incorporated by reference herein and made a part of this specification.

BACKGROUND

Technical Field

The disclosure relates to an electronic device, and in particular to a power conversion apparatus.

Description of Related Art

For safety reasons, the power supply design of the limited power source (LPS) standard must comply with the maximum allowable output voltage, output current, and output power standards. The advantage that power supply of the LPS brings to customers is that system installers only need to comply with relatively relaxed requirements when wiring and field-installing loads powered by the power supply of the LPS. Since the output current and voltage delivered to the load are limited, a qualified power supply of the LPS is unlikely to cause electric shock or fire.

Generally, power conversion circuits on the market usually require two sets of optical coupling elements to communicate for limited power protection, so there are problems of wasted space and additional costs.

SUMMARY

The disclosure provides a power conversion apparatus which can save circuit space and reduce costs while complying with the limited power source standard.

A power conversion apparatus of the disclosure includes a transformer circuit, a power switch, a control circuit, an auxiliary coil, an optocoupler, and a bargaining circuit. The transformer circuit includes a primary coil and a secondary coil, receives an input voltage, and outputs an output voltage. The power switch is coupled between the primary coil and a ground. The control circuit is coupled to the power switch, and controls the power switch to switch between an on-state and an off-state to control output of the transformer circuit. The auxiliary coil is coupled to the control circuit, and senses a current of the primary coil to generate an induced voltage. The optocoupler is coupled to the control circuit. The bargaining circuit is coupled to the secondary coil and the optocoupler, and controls the optocoupler to provide a feedback voltage to the control circuit according to the output of the transformer circuit. The control circuit executes a limited power operation when the induced voltage instructs that the output voltage is lower than a first setting voltage and the feedback voltage is higher than a second setting voltage.

In an embodiment of the disclosure, the bargaining circuit determines whether the output voltage is greater than a preset voltage in a limited power source protection mode, and controls the optocoupler to adjust the feedback voltage in response to the output voltage being greater than the preset voltage, so that the control circuit reduces the output voltage according to the feedback voltage.

In an embodiment of the disclosure, the control circuit reduces a duty ratio of a pulse width modulation control signal provided to the power switch to reduce the output voltage.

In an embodiment of the disclosure, the bargaining circuit determines whether the output voltage is lower than the first setting voltage, and turns off the optocoupler to increase the feedback voltage in response to the output voltage being lower than the first setting voltage.

In an embodiment of the disclosure, the optocoupler includes a light emitting diode and a phototransistor. The light emitting diode is coupled to the bargaining circuit, and is controlled by the bargaining circuit to generate a light signal. The phototransistor is coupled to the control circuit, and receives the light signal to generate the feedback voltage.

In an embodiment of the disclosure, the bargaining circuit controls the light emitting diode to stop generating the light signal to turn off the optocoupler.

In an embodiment of the disclosure, the limited power operation includes controlling the power switch to be in the off state.

In an embodiment of the disclosure, the control circuit is an analog-to-digital converter chip.

In an embodiment of the disclosure, the bargaining circuit is a power delivery integrated circuit.

In an embodiment of the disclosure, the power conversion apparatus further includes a full-bridge rectifier circuit which is coupled to the transformer circuit, and performs a full wave rectification on an alternating current input voltage to generate the input voltage.

Based on the above, the control circuit of the embodiments of the disclosure may execute the limited power operation according to the induced voltage provided by the auxiliary coil and the feedback voltage provided by the optocoupler, for example, when the induced voltage instructs that the output voltage of the transformer circuit is lower than the first setting voltage and the feedback voltage is higher than the second setting voltage. As such, when there is no need to use two optocouplers, the output of the power conversion apparatus complies with the limited power source standard, thereby saving the circuit space effectively and reducing costs.

DESCRIPTION OF THE EMBODIMENTS

Figure 1:
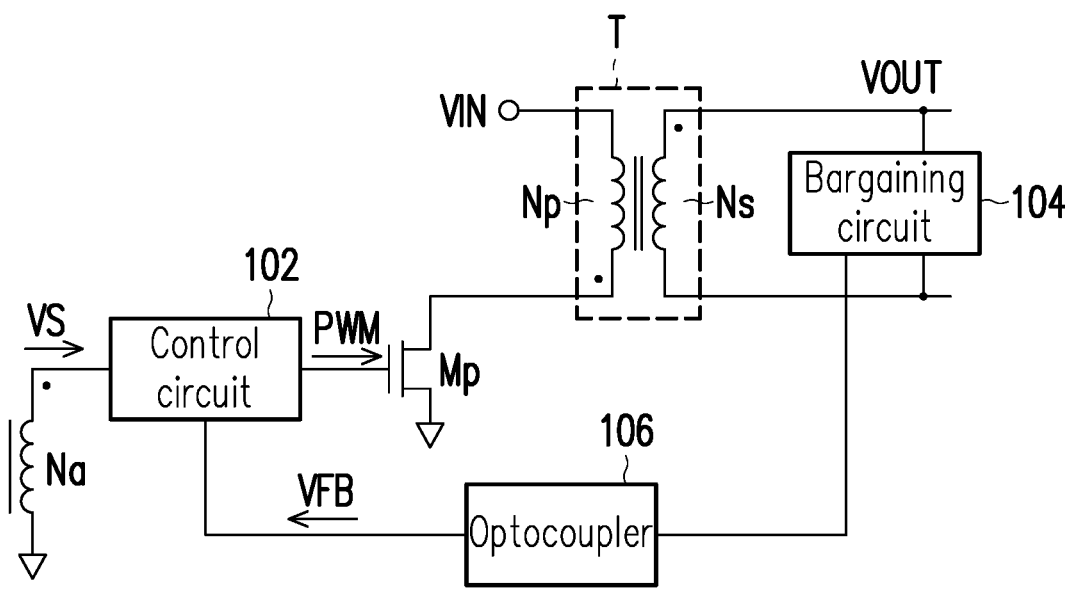
FIG. 1 is a schematic diagram of a power conversion apparatus according to the disclosure.

FIG. 1 is a schematic diagram of a power conversion apparatus according to the disclosure. The power conversion apparatus may include a transformer circuit T, a power switch Mp, a control circuit 102, a bargaining circuit 104, an optocoupler 106, and an auxiliary coil Na. The transformer circuit T includes a primary coil Np and a secondary coil Ns. A first terminal of the primary coil Np receives an input voltage VIN. The power switch Mp is coupled between a second terminal of the primary coil Np and a ground. A control terminal of the power switch Mp is coupled to the control circuit 102. In this embodiment, the power switch Mp is implemented by a transistor, but the disclosure is not limited to thereto. The bargaining circuit 104 is coupled to the secondary coil Ns. The bargaining circuit 104 may be implemented, for example, with a power delivery integrated circuit (IC). The optocoupler 106 is coupled to the control circuit 102 and the bargaining circuit 104, and the auxiliary coil Na is coupled to the control circuit 102, where the optocoupler 106 is controlled by the bargaining circuit 104 and provides a feedback voltage VFB to the control circuit 102, and the auxiliary coil Na may sense a current of the primary coil Np to generate an induced voltage VS. The induced voltage VS may be configured to instruct magnitude of an output voltage VOUT of the transformer circuit T.

The transformer circuit T receives the input voltage VIN and converts the input voltage VIN into the output voltage VOUT. The control circuit 102 may output a pulse width modulation control signal PWM to the control terminal of the power switch Mp to control the power switch Mp to switch between an on-state and an off-state so as to control the output voltage VOUT of the transformer circuit T.

When determining that an output current or output power of the transformer circuit T is close to a current value or a power value specified by a limited power source standard in a limited power source protection mode, the bargaining circuit 104 may turn off the blocking metal oxide semiconductor field effect transistor (MOS) inside the bargaining circuit 104, so that the output of the power conversion apparatus complies with the current value or the power value specified by the limited power source standard. A condition that the blocking MOS inside the bargaining circuit 104 is turned off and the bargaining circuit 104 still detects the current of the blocking MOS represents that the blocking MOS has a short circuit. At this time, the bargaining circuit 104 may determine whether the output voltage VOUT is greater than a preset voltage. When determining that the output voltage VOUT is greater than the preset voltage, the bargaining circuit 104 controls the optocoupler 106 to adjust the feedback voltage VFB provided to the control circuit 102, so that the control circuit 102 reduces a duty ratio of the pulse width modulation control signal PWM provided to the power switch Mp to reduce the output voltage VOUT output by the transformer circuit T according to the feedback voltage VFB.

After detecting that the output voltage VOUT decreases to a first setting voltage (where the first setting voltage is less than the preset voltage), the bargaining circuit 104 may turn off the optocoupler 106 to increase the feedback voltage VFB, so that the feedback voltage VFB is higher than a second setting voltage. The control circuit 102 may learn the output voltage VOUT of the transformer circuit T through the induced voltage VS generated by the auxiliary coil Na and execute limited power operation to meet requirements of the limited power source standard for the output voltage VOUT when the induced voltage VS instructs that the output voltage VOUT of the transformer circuit T is lower than the first setting voltage and the feedback voltage VFB is higher than then second setting voltage. The limited power operation may, for example, control the power switch Mp to be in the off state, but the disclosure is not limited thereto.

As described above, the bargaining circuit 104 of this embodiment may make the control circuit 102 reduce the output voltage VOUT by adjusting the output feedback voltage VFB of the optocoupler 106 and turn off the optocoupler 106 to increase the feedback voltage VFB when the output voltage VOUT is lower than the first setting voltage.

The control circuit 102 may execute the limited power operation when the output voltage VOUT of the transformer circuit T is lower than the first setting voltage and the feedback voltage VFB is higher than the second setting voltage. As such, when there is no need to use two optocouplers, the output of the power conversion apparatus may also be made to comply with the limited power source standard, thereby saving a circuit space effectively and reducing costs.

Figure 2:
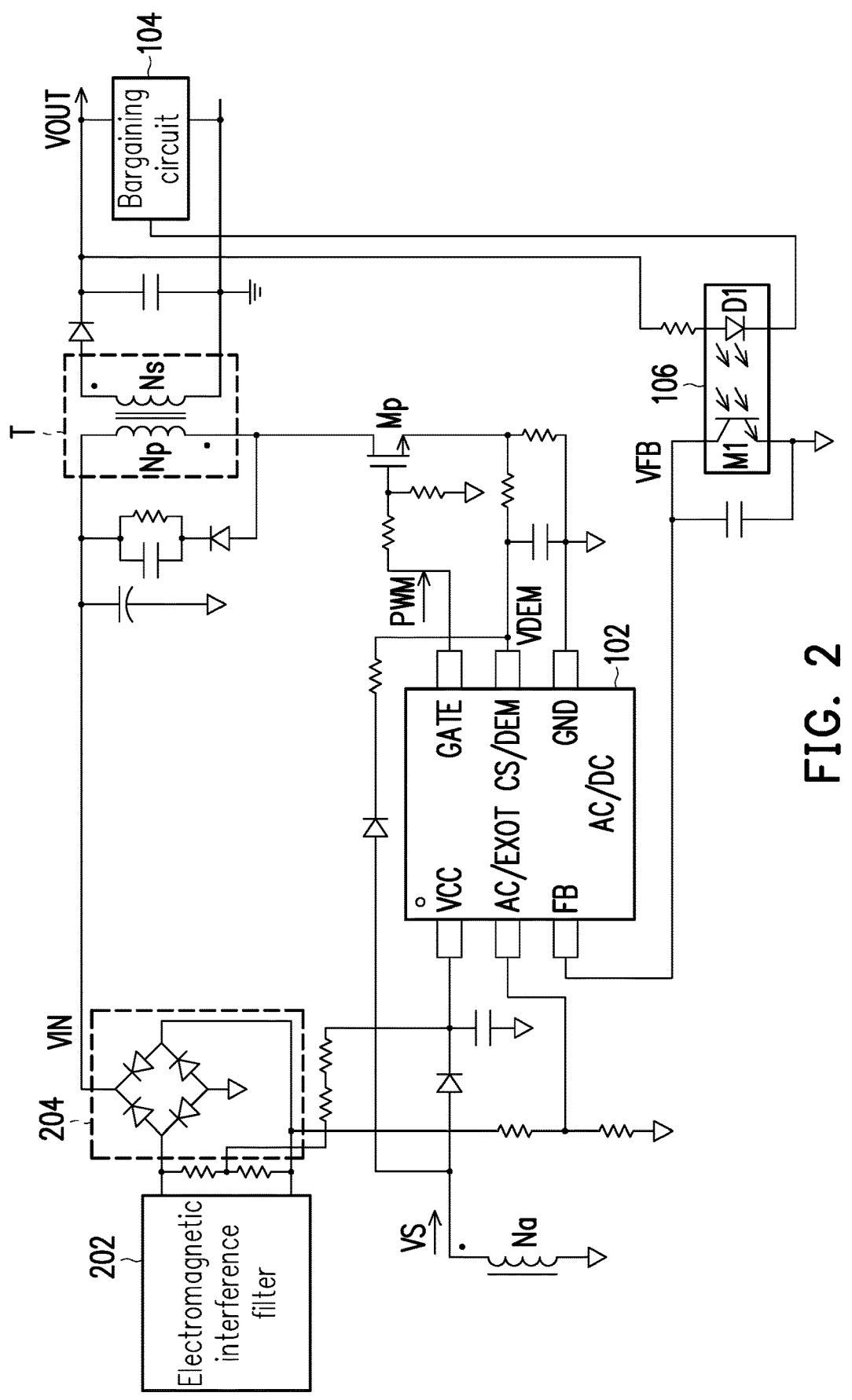
FIG. 2 is a schematic diagram of a power conversion apparatus according to another embodiment of the disclosure.

Further, the implementation of the power conversion apparatus is shown in FIG. 2. In the embodiment of FIG. 2, in addition to the transformer circuit T, the control circuit 102, the bargaining circuit 104, the optocoupler 106, and the auxiliary coil Na, the power conversion apparatus may further include an electromagnetic interference filter 202 and a full-bridge rectifier circuit 204. The electromagnetic interference filter 202 is coupled to the full-bridge rectifier circuit 204, and the full-bridge rectifier circuit 204 is coupled to the primary coil Np.

In addition, the control circuit 102 is implemented with an analog-to-digital converter (AC/DC) chip. The optocoupler 106 includes a light emitting diode D1 and a phototransistor M1. The light emitting diode D1 is coupled to the bargaining circuit 104. The phototransistor M1 is coupled to the control circuit. 102. The AC/DC chip may include six pins such as VCC. AC/EXOT, FB, GATE, CS/DEM, and GND. The auxiliary coil Na is coupled to the pin CS/DEM by a diode and a resistor, the control terminal of the power switch Mp is coupled to the pin GATE, and the phototransistor M1 is coupled to the pin FB.

Figure 3:
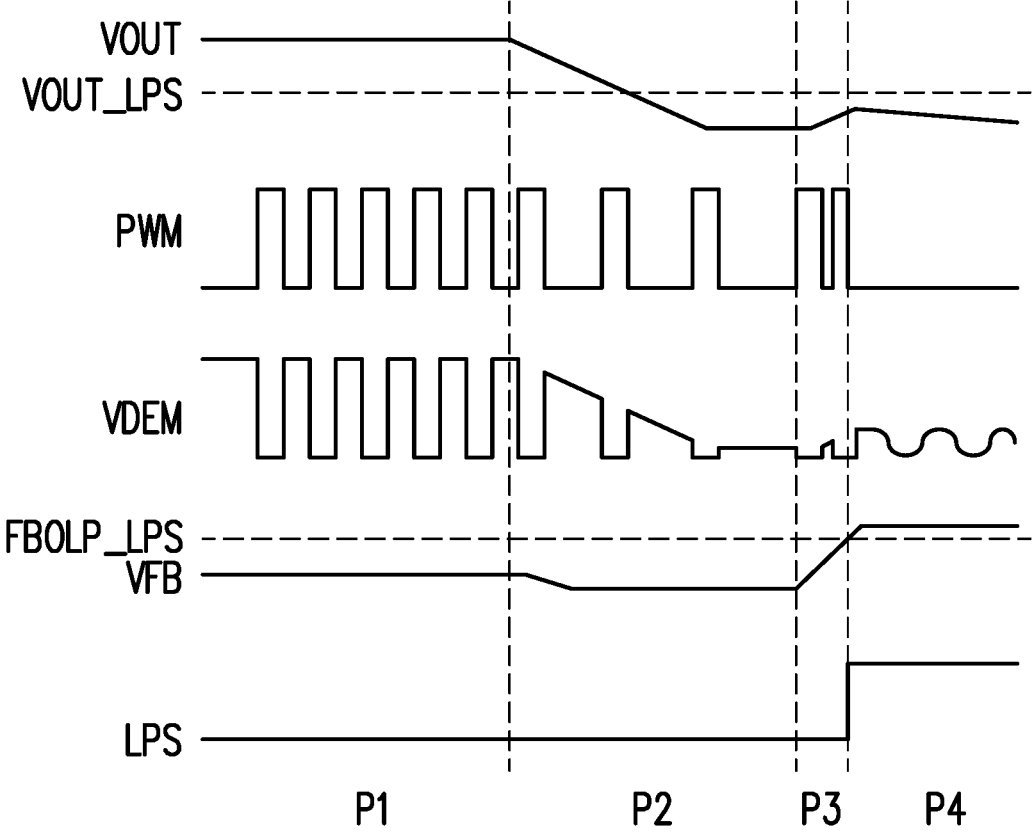
FIG. 3 is a timing diagram of operation of a power conversion apparatus according to the disclosure.

The electromagnetic interference filter 202 may filter an alternating current input voltage to filter out electromagnetic interference. The full-bridge rectifier circuit 204 may perform full wave rectification on the alternating current input voltage filtered by the electromagnetic interference filter 202 to generate the input voltage VIN. The operation timing of the power conversion apparatus is shown in FIG. 3. During a period P1, the bargaining circuit 104 determines that the output voltage VOUT is greater than the preset voltage, and the control optocoupler 106 begins to reduce the feedback voltage VFB provided to the control circuit 102. During a period P2, the control circuit 102 detects that the feedback voltage VFB received by the pin FB decreases, and therefore reduces the duty ratio of the pulse width modulation control signal PWM provided to the power switch Mp to reduce the output voltage VOUT of the transformer circuit T. At this time, a voltage VDEM received by the pin CS/DEM of the control circuit 102 also decreases as the output voltage VOUT decreases. During a period P3, the bargaining circuit 104 detects that the output voltage VOUT has dropped below the first setting voltage VOUT_LPS, and therefore stops providing a driving current to the light emitting diode D1, so that the light emitting diode D1 stops providing a light signal. The phototransistor M1 enters the off state because the light emitting diode D1 stops providing the light signal, so that the increased resistor coupled to the pin FB and the inside of the control circuit 102 increases the voltage (that is, the feedback voltage VFB) on the pin FB to be higher than the second setting voltage FBOLP_LPS. During a period P4, the control circuit 102 learns that the output voltage VOUT is lower than the first setting voltage VOUT-_LPS according to the induced voltage VS (that is, according to the voltage VDEM on the pin CS/DEM) provided by the auxiliary coil Na, and learns that the feedback voltage VFB is higher than the second setting voltage FBOLP_LPS from the pin FB. Therefore, the control circuit 102 determines that the power conversion apparatus has entered the limited power supply (LPS) protection, and controls the pulse width modulation control signal PWM to maintain at a low voltage, so that the power switch Mp is in the off state, and the output voltage VOUT complies with the requirements of the limited power source standard.

To sum up, the control circuit of the embodiments of the disclosure may execute the limited power operation according to the induced voltage provided by the auxiliary coil and the feedback voltage provided by the optocoupler, for example, when the induced voltage instructs that the output voltage of the transformer circuit is lower than the first setting voltage and the feedback voltage is higher than the second setting voltage. As such, when there is no need to use two optocouplers, the output of the power conversion apparatus complies with the limited power source standard, thereby saving the circuit space effectively and reducing costs.

What is claimed is:

1. A power conversion apparatus, comprising:
a transformer circuit, comprising a primary coil and a secondary coil, receiving an input voltage, and outputting an output voltage;
a power switch, coupled between the primary coil and a ground;
a control circuit, coupled to the power switch, and controlling the power switch to switch between an on-state and an off-state to control output of the transformer circuit;
an auxiliary coil, coupled to the control circuit, and sensing a current of the primary coil to generate an induced voltage;
an optocoupler, coupled to the control circuit; and
a bargaining circuit, coupled to the secondary coil and the optocoupler, and controlling the optocoupler to provide a feedback voltage to the control circuit according to the output of the transformer circuit, wherein the control circuit executes a limited power operation when the induced voltage instructs that the output voltage is lower than a first setting voltage and the feedback voltage is higher than a second setting voltage,
wherein the bargaining circuit determines whether the output voltage is greater than a preset voltage in a limited power source protection mode, and controls the optocoupler to adjust the feedback voltage in response to the output voltage being greater than the preset voltage, so that the control circuit reduces the output voltage according to the feedback voltage.

2. The power conversion apparatus according to claim 1, wherein the control circuit reduces a duty ratio of a pulse width modulation control signal provided to the power switch to reduce the output voltage.

3. The power conversion apparatus according to claim 1, wherein the bargaining circuit determines whether the output voltage is lower than the first setting voltage, and turns off the optocoupler to increase the feedback voltage in response to the output voltage being lower than the first setting voltage.

4. The power conversion apparatus according to claim 3, wherein the optocoupler comprises:
a light emitting diode, coupled to the bargaining circuit, and controlled by the bargaining circuit to generate a light signal; and
a phototransistor, coupled to the control circuit, and receiving the light signal to generate the feedback voltage.

5. The power conversion apparatus according to claim 4, wherein the bargaining circuit controls the light emitting diode to stop generating the light signal to turn off the optocoupler.

6. The power conversion apparatus according to claim 1, wherein the limited power operation comprises controlling the power switch to be in the off state.

7. The power conversion apparatus according to claim 1, wherein the control circuit is an analog-to-digital converter chip.

8. The power conversion apparatus according to claim 1, wherein the bargaining circuit is a power delivery integrated circuit.

9. The power conversion apparatus according to claim 1, further comprising:
a full-bridge rectifier circuit, coupled to the transformer circuit, and performing a full wave rectification on an alternating current input voltage to generate the input voltage.

* * * * *